US009760107B2

(12) United States Patent
Kashima et al.

(10) Patent No.: US 9,760,107 B2
(45) Date of Patent: Sep. 12, 2017

(54) SEMICONDUCTOR DEVICE

(71) Applicant: RENESAS ELECTRONICS CORPORATION, Kawasaki-shi, Kanagawa (JP)

(72) Inventors: Issei Kashima, Kawasaki (JP); Jingo Nakanishi, Kawasaki (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 192 days.

(21) Appl. No.: 14/724,619

(22) Filed: May 28, 2015

(65) Prior Publication Data

US 2015/0346756 A1 Dec. 3, 2015

(30) Foreign Application Priority Data

Jun. 2, 2014 (JP) ................................ 2014-114021

(51) Int. Cl.
*G06F 3/08* (2006.01)
*G05F 3/08* (2006.01)

(52) U.S. Cl.
CPC .................................... *G05F 3/08* (2013.01)

(58) Field of Classification Search
CPC ................................................. G06F 17/5072
USPC ................................ 716/118, 119, 132, 135
See application file for complete search history.

(56) References Cited

U.S. PATENT DOCUMENTS 5,132,555 A 7/1992 Takahashi
6,509,854 B1 * 1/2003 Morita et al. ......... H03M 1/685 341/143
7,750,681 B2 * 7/2010 Ogata ................. H01L 23/5286 257/207
7,944,243 B2 * 5/2011 Ogata ................. H01L 23/5286 257/207
8,312,408 B2 * 11/2012 Itagaki ................ G06F 17/5068 716/111
8,456,025 B2 * 6/2013 Yokoyama ............. H01L 24/06 257/786
9,190,378 B2 * 11/2015 Abematsu et al. ..... H01L 23/12
9,268,894 B2 * 2/2016 Sharma et al. ..... G06F 17/5077
2001/0054760 A1 12/2001 Ito et al.
2007/0164809 A1 7/2007 Fukuda et al.

(Continued)

FOREIGN PATENT DOCUMENTS

JP H03-246961 A 11/1991
JP H05-121650 A 5/1993
JP 2002-083872 A 3/2002

(Continued)

OTHER PUBLICATIONS

Office Action issued in corresponding Japanese Patent Application No. 2014-114021, dated Aug. 1, 2017.

*Primary Examiner* — Sun Lin
(74) *Attorney, Agent, or Firm* — McDermott Will & Emery LLP

(57) ABSTRACT

A plurality of IO cells are arranged along an edge portion of a semiconductor chip. Some elements forming a reference voltage generation circuit are arranged in a first corner region of the semiconductor chip. Remaining elements forming the reference voltage generation circuit are arranged in a core region on an inner side of the edge portion of the semiconductor chip. Among a plurality of corner regions, the first corner region is located closest to the remaining elements.

18 Claims, 14 Drawing Sheets

(56) References Cited

U.S. PATENT DOCUMENTS

2012/0025272 A1 2/2012 Usami

FOREIGN PATENT DOCUMENTS

| | | | |
|---|---|---|---|
| JP | 2003-318275 | A | 11/2003 |
| JP | 2004-327538 | A | 11/2004 |
| JP | 2010-010168 | A | 1/2010 |
| JP | 2010-258298 | A | 11/2010 |
| NO | 2005/062150 | A1 | 7/2005 |

* cited by examiner

SEMICONDUCTOR DEVICE

BACKGROUND OF THE INVENTION

Field of the Invention

The present invention relates to a semiconductor device.

Description of the Background Art

Conventionally, there is a known technique for effectively utilizing an area that can be used on a semiconductor chip by arranging some of elements in a corner of a semiconductor chip.

For example, Japanese Patent Laying-Open No. 2004-327538 discloses a semiconductor chip including an ESD (Electronic Static Discharge) protection element arranged in a corner of a chip sandwiched between IO regions (input/output regions).

Japanese Patent Laying-Open No. 2010-010168 discloses a semiconductor chip including an oscillation circuit arranged in a corner of a chip sandwiched between IO regions.

Japanese Patent Laying-Open No. 05-121650 discloses a semiconductor chip including a reference voltage generation circuit arranged in each of four chip corner regions.

Japanese Patent Laying-Open No. 2010-258298 discloses that a memory circuit, an electric fuse, an analog circuit, a CPU, a logic circuit, a power supply circuit, an ESD protection terminal, a standard cell, and the like are arranged in a circuit core arrangement region at a corner portion of a semiconductor chip.

SUMMARY OF THE INVENTION

In Japanese Patent Laying-Open Nos. 2004-327538 and 2010-010168, however, the ESD protection element and the oscillation circuit are arranged in the corner region of the semiconductor chip, but an element of the reference voltage circuit generating a reference voltage from an external power supply voltage is not arranged in the corner region of this semiconductor chip. Furthermore, the positional relation between an element arranged in the corner region of the chip and an element arranged in the core region and connected to this element is not taken into consideration.

Japanese Patent Laying-Open No. 05-121650 discloses a semiconductor chip having an edge at which a driver circuit is arranged but an IO region is not arranged. Furthermore, the reference voltage generated in the reference voltage generation circuit is supplied to the driver circuit at the edge of the chip, but not supplied to an element in the inner core region.

Japanese Patent Laying-Open No. 2010-258298 discloses a semiconductor chip in which an element of a reference voltage circuit generating a reference voltage from an external power supply voltage is not arranged in the corner region of the semiconductor chip. Also, the positional relation between an element arranged in the corner region of the chip and an element connected to this element and arranged in the core region is not taken into consideration.

Other problems and novel characteristics will be apparent from the description in the present specification and the accompanying drawings.

A semiconductor device in one embodiment of the present invention includes a semiconductor chip having an edge portion along which a plurality of IO cells are arranged. Some elements forming a reference voltage generation circuit are arranged in a first corner region of the semiconductor chip, and remaining elements forming the reference voltage generation circuit are arranged in a core region on an inner side of the edge portion of the semiconductor chip. Among the plurality of corner regions, the first corner region is located closest to the remaining elements.

According to one embodiment of the present invention, some elements forming the reference voltage generation circuit are arranged in the corner region that is a dead space in which an IO cell cannot be arranged, so that the number of elements that can be arranged on the semiconductor chip can be increased. Furthermore, since the distance of the wiring line between some elements forming the reference voltage generation circuit and the remaining elements forming the reference voltage generation circuit can be reduced, mixture of noise can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present invention will be hereinafter described with reference to the accompanying drawings.

First Embodiment

Figure 1:
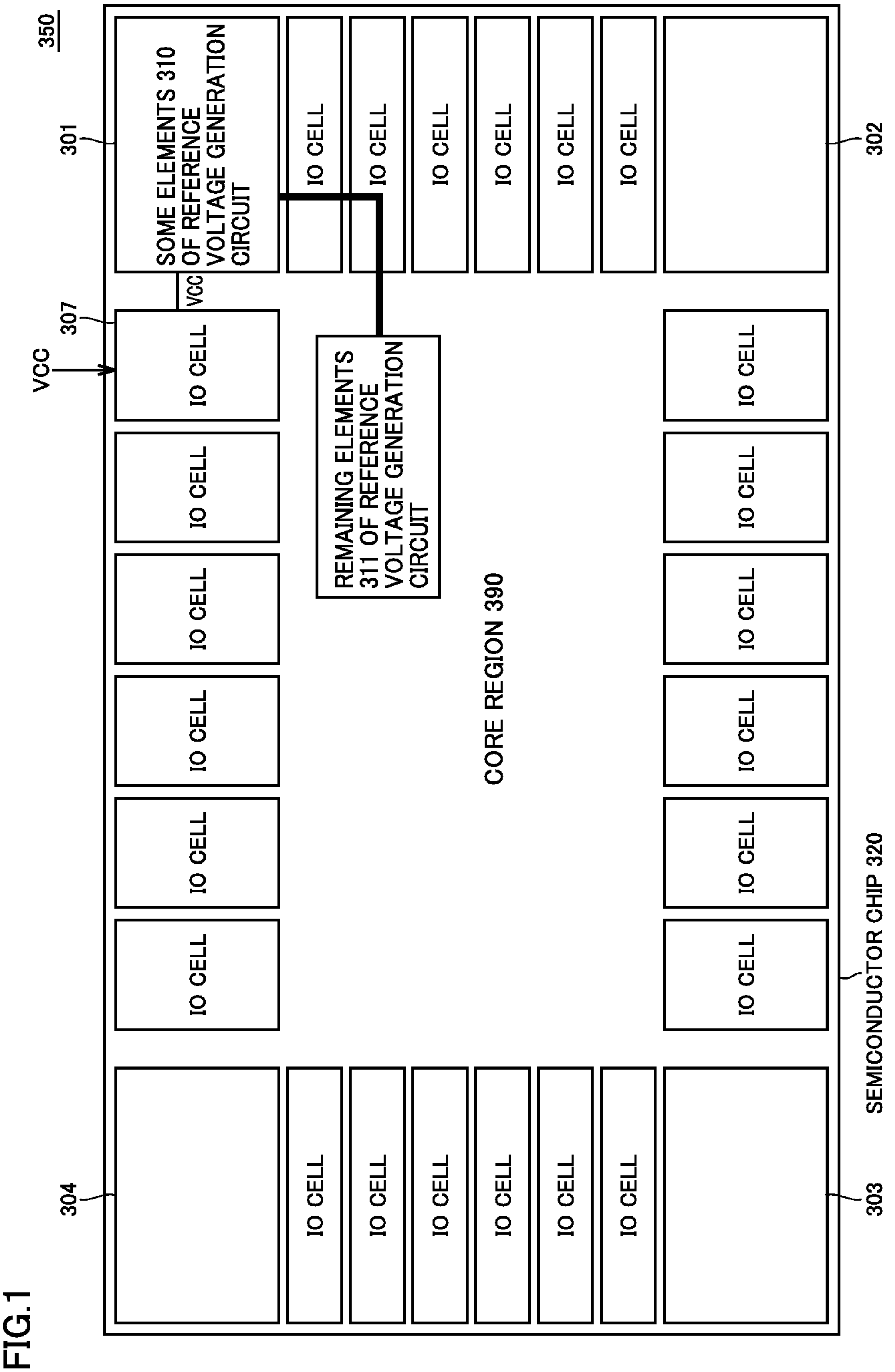
FIG. 1 is a diagram showing the configuration of a semiconductor device in the first embodiment.

FIG. 1 is a diagram showing the configuration of a semiconductor device in the first embodiment.

This semiconductor device 350 includes a semiconductor chip 320, a plurality of IO cells 307 arranged along each of edge portions of semiconductor chip 320, and a reference voltage generation circuit mounted on semiconductor chip 320 and receiving an external power supply voltage VCC supplied to an external power supply terminal to generate a reference voltage.

Some elements 310 forming the reference voltage generation circuit are arranged in a first corner region 301 of semiconductor chip 320. Remaining elements 311 forming the reference voltage generation circuit are arranged in a core region 390 on the inner side of the edge portion of the semiconductor chip. Among first corner region 301, second corner region 302, a third corner region 303, and a fourth corner region 304, first corner region 301 is located closest to remaining elements 311.

As described above, according to the present embodiment, some elements forming the reference voltage generation circuit are arranged in the corner region that is a dead space in which an IO cell cannot be arranged, so that it becomes possible to increase the number of elements that can be arranged on the semiconductor chip. Furthermore, the corner region in which some elements forming the reference voltage generation circuit are arranged is located close to a region in which the remaining elements forming the reference voltage generation circuit are arranged. Accordingly, the distance of the wiring line between these regions can be shortened, so that mixture of noise can be suppressed.

Second Embodiment

Figure 2:
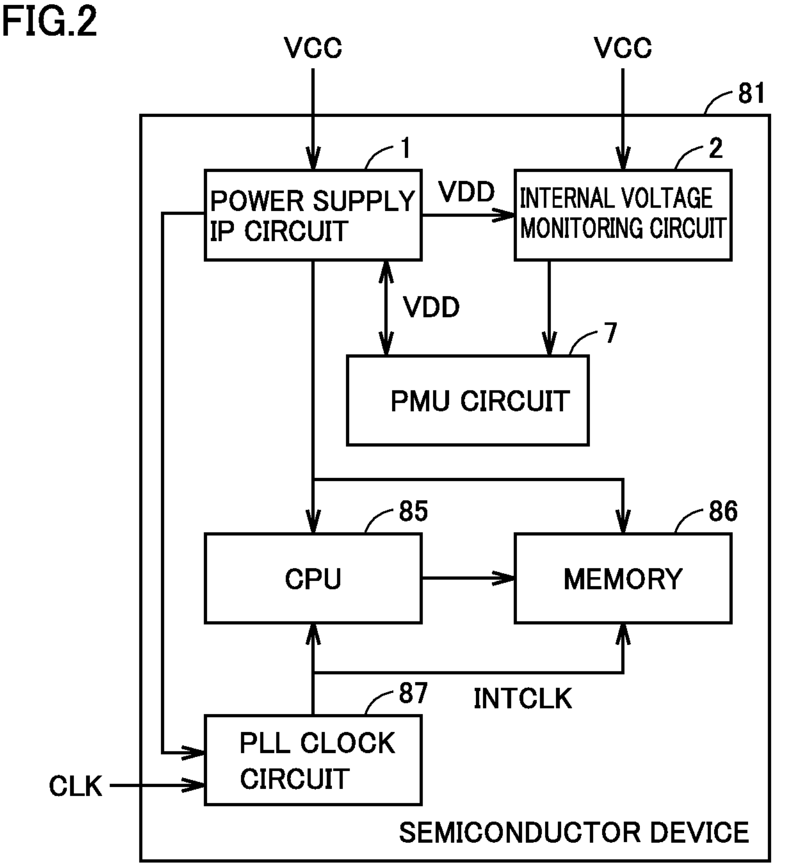
FIG. 2 is a diagram showing the configuration of a semiconductor device in the second embodiment.

FIG. 2 is a diagram showing the configuration of a semiconductor device in the second embodiment.

This semiconductor device 81 includes a power supply IP circuit 1 mounted on the semiconductor chip, an internal voltage monitoring circuit 2, a PMU (Power Management Unit) circuit 7, a CPU (Central Processing Unit) 85, a memory 86, and a PLL (phase locked loop) clock circuit 87.

Power supply IP circuit 1 receives external power supply voltage VCC, generates an internal voltage VDD from external power supply voltage VCC, and supplies internal voltage VDD to each component (CPU 85, memory 86, and PLL clock circuit 87) of semiconductor device 81.

Internal voltage monitoring circuit 2 monitors internal voltage VDD generated in power supply IP circuit 1.

PMU circuit 7 controls power supply IP circuit 1 in accordance with internal voltage VDD output from power supply IP circuit 1 and a detection signal from internal voltage monitoring circuit 2.

CPU 85 controls the entire operation of semiconductor device 81.

Memory 86 controls various pieces of data and various kinds of programs.

PLL clock circuit 87 generates an internal clock INTCLK from an external clock CLK, and supplies the clock to CPU 85 and memory 86.

Figure 3:
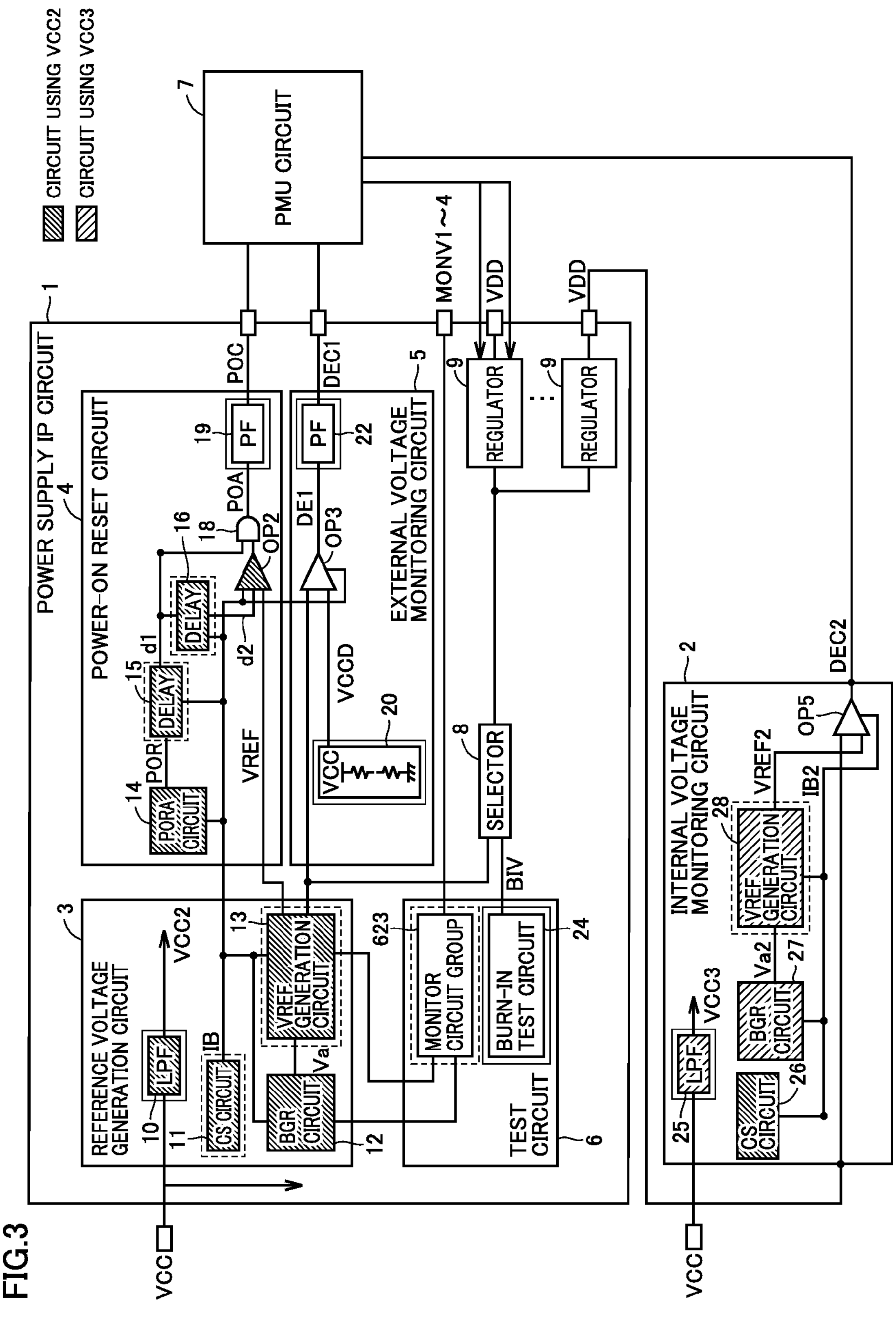
FIG. 3 is a diagram showing the configuration of each of a power supply IP circuit and an internal voltage monitoring circuit.

FIG. 3 is a diagram showing the configuration of each of power supply IP circuit 1 and internal voltage monitoring circuit 2.

Power supply IP circuit 1 includes a reference voltage generation circuit 3, a power-on reset circuit 4, a test circuit 6, an external voltage monitoring circuit 5, a selector 8, and a plurality of regulators 9.

Reference voltage generation circuit 3 generates a reference voltage VREF from external power supply voltage VCC supplied from outside the semiconductor device 81.

At the startup of semiconductor device 81, power-on reset circuit 4 generates a reset signal POC and supplies it to CPU 85.

External voltage monitoring circuit 5 compares a reference voltage VREF output from reference voltage generation circuit 3 and a voltage obtained by dividing external power supply voltage VCC, thereby monitoring whether external power supply voltage VCC has a normal magnitude or not.

Test circuit 6 is used at the time when semiconductor device 81 is tested.

Internal voltage monitoring circuit 2 compares internal voltage VDD with a prescribed voltage, thereby monitoring whether internal voltage VDD has a normal magnitude or not.

Selector 8 outputs reference voltage VREF output from reference voltage generation circuit 3 at a normal time, and outputs a burn-in test voltage BIV output from a test circuit 6 during a test.

Regulator 9 receives reference voltage VREF or burn-in test voltage BIV output from selector 8, generates a fixed internal voltage VDD, and supplies the generated voltage to CPU 85, memory 86 and the like.

PMU circuit 7 receives a reset signal POC and detection signals DEC1 and DEC2 to control the operation of regulator 9.

Reference voltage generation circuit 3 includes a low pass filter (LPF) 10, a current source (CS) circuit 11, a band-gap reference (BGR) circuit 12, and a reference voltage (VREF) generation circuit 13. Power-on reset circuit 4 includes a PORA circuit 14, a delay circuit (DELAY) 15, a delay circuit (DELAY) 16, an operational amplifier OP2, an AND circuit 18, and a pulse filter (PF) 19. Test circuit 6 includes a monitor circuit group 623 and a burn-in test circuit 24. External voltage monitoring circuit 5 includes a voltage-dividing circuit 20, an operational amplifier OP3, and a pulse filter (PF) 22. Internal voltage monitoring circuit 2 includes a low pass filter (LPF) 25, a CS circuit 26, a BGR circuit 27, a VREF generation circuit 28, and an operational amplifier OP5.

First, each component included in reference voltage generation circuit 3 will be hereinafter described.

Low pass filter (LPF) 10 removes noise in external power supply VCC and supplies a voltage VCC2, from which noise has been removed, to CS circuit 11, BGR circuit 12, VREF generation circuit 13, delay circuit (DELAY) 15, delay circuit (DELAY) 16, and operational amplifier OP3 that are sensitive to noise.

CS circuit 11 generates a constant current IB and supplies the generated current to BGR circuit 12, VREF generation circuit 13, PORA circuit 14, DELAY 15, DELAY 16, operational amplifier OP2, and operational amplifier OP3.

BGR circuit 12 utilizes a band gap of the bipolar transistor to generate a voltage Va that does not depend on the temperature, the manufacturing process and the power supply voltage, and supplies this voltage to VREF generation circuit 13 and monitor circuit group 623.

VREF generation circuit 13 receives voltage Va and constant current IB to generate reference voltage VREF.

Then, each component included in power-on reset circuit 4 will be hereinafter described.

PORA circuit 14 outputs power-on reset signal POR at the time when external power supply voltage VCC rises. Two DELAYs 15 and 16 and operational amplifier OP2 are provided in order to accommodate both cases where the rising rate of external power supply voltage VCC is higher and lower.

DELAY 15 outputs a signal d1 obtained by delaying power-on reset signal POR.

DELAY 16 outputs a signal d2 obtained by further delaying the output of DELAY 15.

Operational amplifier OP2 amplifies the difference between output signal d2 of DELAY 16 and reference voltage VREF, and outputs the resultant.

AND circuit 18 outputs a logical AND of an output d1 from DELAY 15 and an output from operational amplifier OP2.

Pulse filter (PF) 19 removes noise from the output of AND circuit 18, and outputs reset signal POC.

Then, each component included in test circuit 6 will be hereinafter described.

Monitor circuit group 623 outputs monitor voltages MONV1 to MONV4 obtained by monitoring reference voltage VREF, voltage Va, detection signal DEC1, and internal voltage VDD.

Burn-in test circuit 24 outputs a burn-in test voltage BIV at the time of the burn-in test.

Then, each component included in external voltage monitoring circuit 5 will be hereinafter described.

Voltage-dividing circuit 20 divides an external voltage VCC, and outputs a divided voltage VCCD.

Operational amplifier OP3 compares the magnitudes of divided voltage VCCD and reference voltage VREF, and outputs a signal DE1 showing the comparison result.

Pulse filter (PF) 22 removes noise in output signal DE1 of operational amplifier OP3, and outputs a detection signal DEC1.

Then, each component included in internal voltage monitoring circuit 2 will be hereinafter described.

Low pass filter (LPF) 25 removes noise in external power supply VCC, and supplies a voltage VCC3, from which noise has been removed, to CS circuit 26, BGR circuit 27 and VREF generation circuit 28 that are sensitive to noise.

CS circuit 26 generates a constant current IB2, and supplies the generated current to BGR circuit 27, VREF generation circuit 28 and operational amplifier OP5.

BGR circuit 27 generates a voltage Va2 that does not depend on the temperature, the manufacturing process and the power supply voltage, and supplies the generated voltage to VREF generation circuit 28.

VREF generation circuit 28 receives voltage Va2 and constant current IB2 to generate a reference voltage VREF2.

Operational amplifier OP5 compares the magnitudes of internal voltage VDD and reference voltage VREF2, and outputs a detection signal DEC2 showing the comparison result.

Then, an explanation will be given with regard to a circuit of each component in power supply IP circuit 1 and internal voltage monitoring circuit 2 described above, and also as to whether the circuit is to be arranged or not in the corner region of the semiconductor chip.

(LPF 10)

Figure 4:
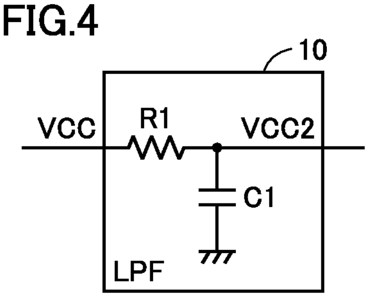
FIG. 4 is a diagram showing the configuration of a low pass filter (LPF).

FIG. 4 is a diagram showing the configuration of a low pass filter (LPF) 10.

LPF 10 is used in order to decrease the noise in power supply voltage VCC.

LPF 10, which consists only of a resistance element R1 and a capacitive element C1, receives an external power supply voltage VCC and outputs a voltage VCC2 from which noise has been removed.

The resistance element and the capacitive element are less influenced by stress. Furthermore, LPF 10 serves to remove the noise in external power supply voltage VCC. Accordingly, even if the characteristics of LPF 10 are changed under influence of stress, the circuit receiving output voltage VCC2 is less influenced thereby.

Therefore, in the present embodiment, the entire circuit of LPF 10 is arranged in the corner region of the semiconductor chip.

When the wiring line connecting LPF 10 and the circuit receiving output voltage VCC2 of LPF 10 is increased in length, noise is more likely to be mixed in the process of transmitting output voltage VCC2. Accordingly, in the present embodiment, LPF 10 arranged in the corner region of the semiconductor chip and the circuit arranged in the core region on the inner side of the edge of the semiconductor chip and receiving output voltage VCC2 of LPF 10 are arranged so as to be close to each other.

In this case, output voltage VCC2 of LPF 10 is received by the remaining circuits within reference voltage generation circuit 3 (CS circuit 11, BGR circuit 12 and VREF generation circuit 13) and operational amplifier OP2 within power-on reset circuit 4.

(Startup Circuit within CS Circuit 11)

Figure 5:
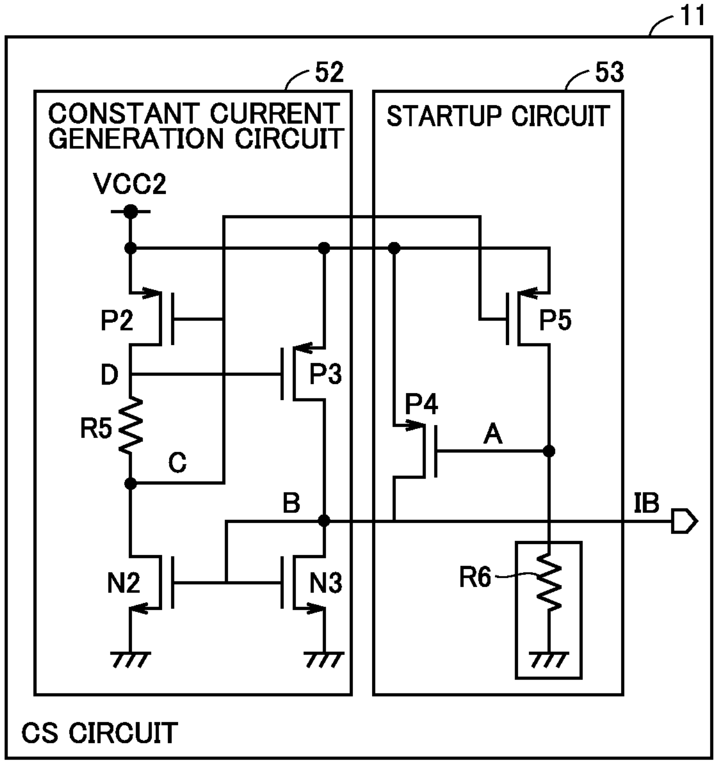
FIG. 5 is a diagram showing the configuration of a CS circuit.

FIG. 5 is a diagram showing the configuration of CS circuit 11.

CS circuit 11 includes a constant current generation circuit 52 and a startup circuit 53.

Constant current generation circuit 52 includes: a P-channel MOS (metal oxide semiconductor) transistor P2, a resistance element R5 and an N-channel MOS transistor N2 that are connected in series between a power supply voltage VCC2 and a ground. Furthermore, constant current generation circuit 52 includes a P-channel MOS transistor P3 and an N-channel MOS transistor N3 that are connected in series between power supply voltage VCC2 and the ground.

Startup circuit 53 includes: a P-channel MOS transistor P4 provided between external power supply voltage VCC2 and a node B, and a P-channel MOS transistor P5 and a resistance element R6 that are connected in series between external power supply voltage VCC2 and the ground.

A node C between N-channel MOS transistor N2 and resistance element R5 is connected to the gate of P-channel MOS transistor P2 and the gate of P-channel MOS transistor P5.

The gate of P-channel MOS transistor P3 is connected to a node D between P-channel MOS transistor P2 and resistance element R5. The gate of N-channel MOS transistor N2 and the gate of N-channel MOS transistor N3 are connected to node B. Constant current IB is output from node B. The gate of P-channel MOS transistor P4 is connected to a node A between P-channel MOS transistor P5 and resistance element R6.

Since two stabilization points exist in current generation circuit 52, these two stabilization points are converged by startup circuit 53 into one stabilization point at which a normal operation can be performed, and the rising rate of the voltage is accelerated.

At the time when power supply voltage VCC2 rises, node A within startup circuit 53 is lowered to 0V by resistance element R6 and thereby attains a low level. Accordingly, P-channel MOS transistor P4 is turned on, to cause a current to be supplied through node B into constant current generation circuit 52. When constant current generation circuit 52 attains a level close to a stabilization point, node A attains a high level. Then, P-channel MOS transistor P4 is turned off, to cause a stabilized constant current IB to be output from node B.

Resistance element R6 included in startup circuit 53 is less influenced by stress. Even if resistance element R6 is influenced by stress, a margin can be relatively readily provided for startup circuit 53.

Therefore, in the present embodiment, resistance element R6 included in startup circuit 53 is arranged in the corner region of the semiconductor chip.

When the wiring line connecting resistance element R6 included in startup circuit 53 and the remaining circuits within startup circuit 53 is increased in length, noise is more likely to be mixed in the wiring line. Accordingly, in the embodiment of the present invention, resistance element R6 included within startup circuit 53 and arranged in the corner region of the semiconductor chip and the remaining circuits included within startup circuit 53 and arranged in the core region on the inner side of the edge of the semiconductor chip are arranged so as to be close to each other.

(Output Stabilization Circuit within VREF Generation Circuit 13)

Figure 6:
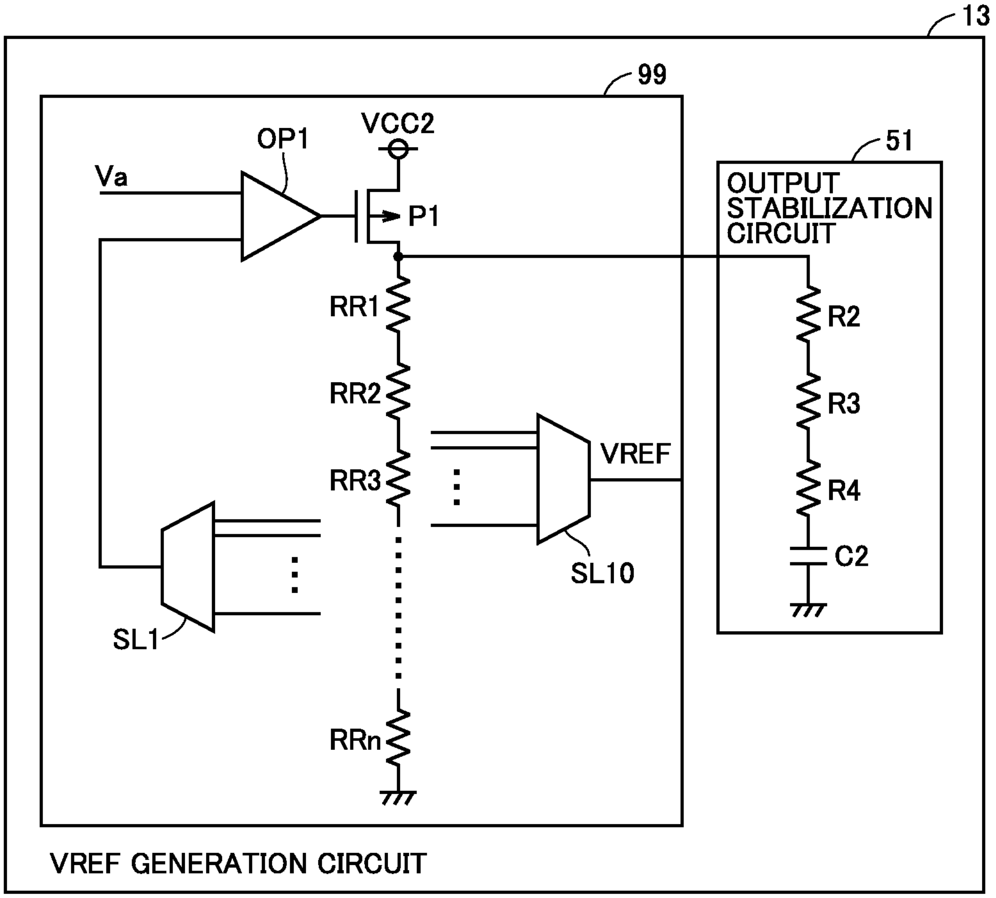
FIG. 6 is a diagram showing the configuration of a VREF generation circuit.

FIG. 6 is a diagram showing the configuration of VREF generation circuit 13.

VREF generation circuit 13 includes a voltage generation unit 99.

Voltage generation unit 99 includes an operational amplifier OP1, selectors SL1 and SL10, a PMOS transistor P1 arranged between external power supply voltage VCC2 and the ground, and a plurality of resistance elements RR1 to RRn connected in series.

Operational amplifier OP1 amplifies the difference between a voltage Va output from BGR circuit 12 and the output of selector SL1, and output the resultant to the gate of PMOS transistor P1.

Selector SL10 outputs, as reference voltage VREF, the voltage on the node selected from the nodes between a plurality of resistance elements adjacent to each other.

Selector SL1 outputs the voltage on the node selected depending on the process variation from the nodes between a plurality of resistance elements adjacent to each other.

Since VREF generation circuit 13 is provided with a feedback path, it includes an output stabilization circuit 51 for improving the phase margin and the PSRR (Power Supply Rejection Ratio) of operational amplifier OP1.

Output stabilization circuit 51 includes resistance elements R2, R3, R4 and a capacitive element C2 that are connected in series between the ground and the node located between the PMOS transistor P1 and resistance element RR1. Output stabilization circuit 51 is formed only of a resistance element and a capacitive element, and therefore, less influenced by stress. Even if this output stabilization circuit 51 is influenced by stress, a margin can be relatively readily provided for VREF generation circuit 13.

Therefore, in the present embodiment, output stabilization circuit 51 is arranged in the corner region of the semiconductor chip.

When the wiring line connecting output stabilization circuit 51 and voltage generation unit 99 located within VREF generation circuit 13 and connected to output stabilization circuit 51 is increased in length, noise is more likely to be mixed in the wiring line. Accordingly, in the embodiment of the present invention, output stabilization circuit 51 included within VREF generation circuit 13 and arranged in the corner region of the semiconductor chip and voltage generation unit 99 included within VREF generation circuit 13 and arranged in the core region on the inner side of the edge of the semiconductor chip are arranged so as to be close to each other.

(PORA Circuit 14)

Figure 7:
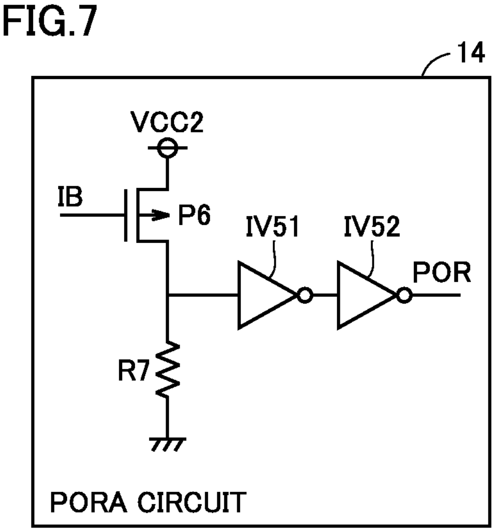
FIG. 7 is a diagram showing the configuration of a PORA circuit.

FIG. 7 is a diagram showing the configuration of PORA circuit 14.

PORA circuit 14 includes a P-channel MOS transistor P6 and a resistance element R7 that are provided between power supply voltage VCC2 and the ground, and inverters IV51 and IV52.

P-channel MOS transistor P6 has a gate that receives constant current IB. The node between P-channel MOS transistor P6 and resistance element R7 is connected to an inverter IV51. An Inverter 152 outputs a power-on reset signal POR.

In the present embodiment, the entire PORA circuit 14 is arranged in the core region on the inner side of the edge of the semiconductor chip.

(Capacitive Element C2 within DELAY 15)

Figure 8:
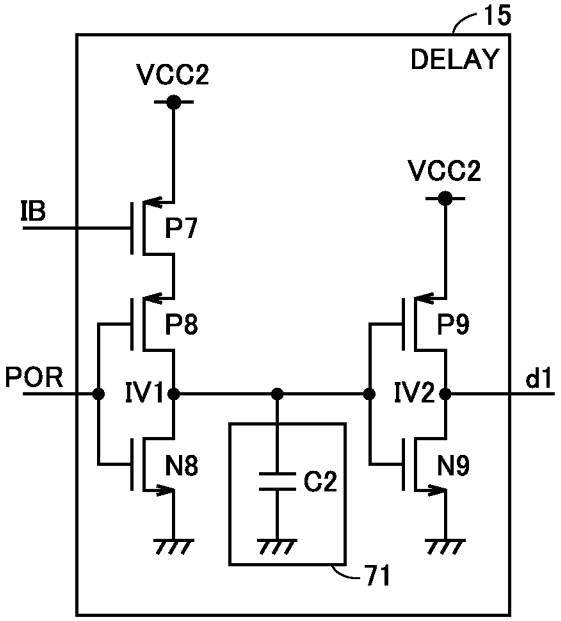
FIG. 8 is a diagram showing the configuration of a DELAY 15.

FIG. 8 is a diagram showing the configuration of DELAY 15.

DELAY 15 includes a P-channel MOS transistor P7, a P-channel MOS transistor P8 and an N-channel MOS transistor N8 that are provided in series between external power supply voltage VCC2 and the ground. Furthermore, DELAY 15 includes a P-channel MOS transistor P9 and an N-channel MOS transistor N9 that are provided in series between external power supply voltage VCC2 and the ground.

P-channel MOS transistor P7 has a gate that receives constant current IB.

Power-on reset signal POR is input into an inverter IV1 formed of P-channel MOS transistor P8 and N-channel MOS transistor N8. The output of inverter IV1 is input into an inverter IV2 formed of P-channel MOS transistor P9 and N-channel MOS transistor N9. Inverter IV2 outputs a delay signal d1.

DELAY 15 further includes a capacitive element C2 for delaying the output of inverter IV1. Capacitive element C2 has a characteristic that it is less influenced by stress.

Therefore, in the present embodiment, capacitive element C2 within DELAY 15 is arranged in the corner region of the semiconductor chip.

When capacitive element C2 is located away from the remaining circuits within DELAY 15, a delay amount increases due to addition of the wiring line capacity and the resistance. This delay amount is however negligible relative to the delay amount caused by capacitive element C2. Also, even if noise is mixed into the wiring line, this noise is removed by a PF 19 on the subsequent stage of DELAY 15.

Therefore, in the present embodiment, capacitive element C2 within DELAY 15 and the remaining elements within DELAY 15 are arranged so as to be relatively away from each other, in consideration of the space in the entire circuit.

(Capacitive Element C8 within DELAY 16)

Figure 9:
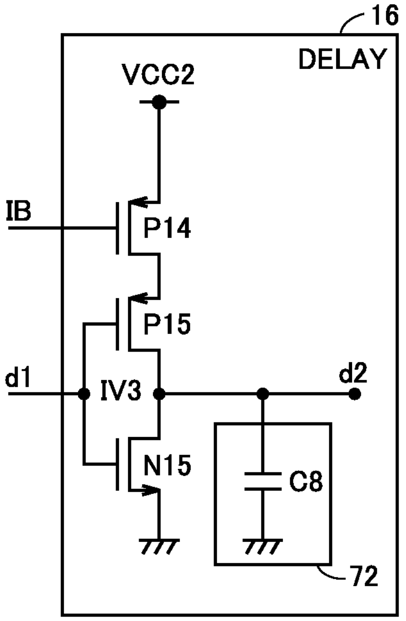
FIG. 9 is a diagram showing the configuration of a DELAY 16.

FIG. 9 is a diagram showing the configuration of DELAY 16.

DELAY 16 includes a P-channel MOS transistor P14, a P-channel MOS transistor P15 and an N-channel MOS transistor N15 that are provided in series between an external power supply voltage VCC2 and the ground.

P-channel MOS transistor P14 has a gate that receives constant current IB.

Delay signal d1 is input into an inverter W3 formed of P-channel MOS transistor P15 and N-channel MOS transistor N15. Inverter W3 outputs a delay signal d2 obtained by further delaying delay signal d1.

DELAY 16 includes a capacitive element C8 for further delaying the input signal.

Capacitive element C8 has a characteristic that it is less influenced by stress. Therefore, in the present embodiment, capacitive element C8 within DELAY 16 is arranged in the corner region of the semiconductor chip.

When capacitive element C8 is located away from the remaining circuits within DELAY 16, a delay amount increases due to addition of the wiring line capacity and the resistance. This delay amount is however negligible relative to the delay amount caused by capacitive element C8. Also, even if noise is mixed into the wiring line, this noise is removed by a PF 19 on the subsequent stage of DELAY 16.

Therefore, in the present embodiment, capacitive element C8 within DELAY 16 and the remaining elements within DELAY 16 are arranged so as to be relatively away from each other, in consideration of the space in the entire circuit.

(Pulse Filter (PF) 19)

Figure 10:
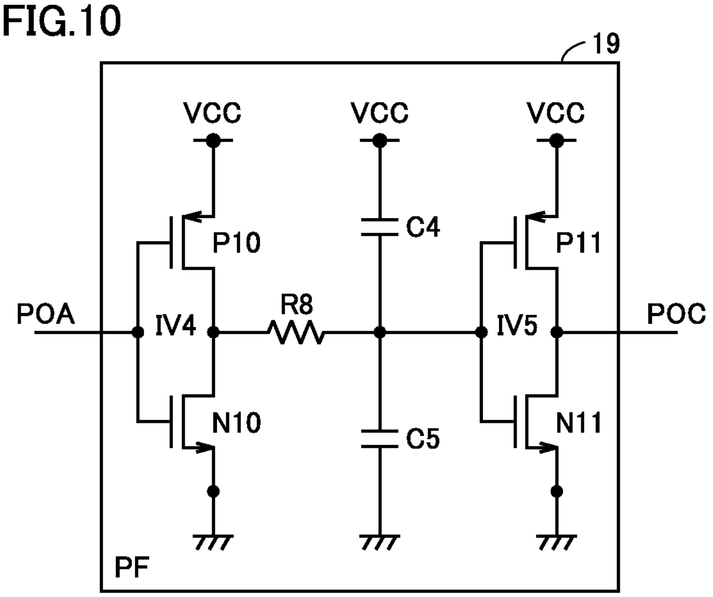
FIG. 10 is a diagram showing the configuration of a PF 19.

FIG. 10 is a diagram showing the configuration of PF 19.

PF 19 includes: an inverter W4 formed of a P-channel MOS transistor P10 and an N-channel MOS transistor N10; and an inverter W5 formed of a P-channel MOS transistor P11 and an N-channel MOS transistor N11. PF 19 further includes: capacitive elements C4 and C5 connected in series between an external power supply voltage VCC and the ground, and a resistance element R8 provided between the output of inverter W4 and the input of inverter IV5.

Inverter W4 receives a reset signal POA. The input of inverter IV5 is connected between capacitive element C4 and capacitive element C5. Inverter IV5 outputs reset signal POC.

PF 19 is a digital circuit. In other words, signal POA to be input and signal POC to be output each are a low-level or high-level digital signal.

Therefore, even if the elements forming PF 19 are influenced by stress, the characteristics of signal POC to be output are not significantly changed.

Therefore, in the present embodiment, the entire circuit of PF 19 is arranged in the corner region of the semiconductor chip.

Furthermore, signal POA to be input and signal POC to be output each are a digital signal. Accordingly, even if noise is mixed into the wiring line leading to the circuit connected to PF 19, these signals are less influenced by noise. Therefore, in the present embodiment, PF 19 and AND circuit 18 connected to this PF 19 are arranged so as to be relatively away from each other in consideration of the space in the entire circuit.

(Voltage-Dividing Circuit 20 within External Voltage Monitoring Circuit 5)

Figure 11:
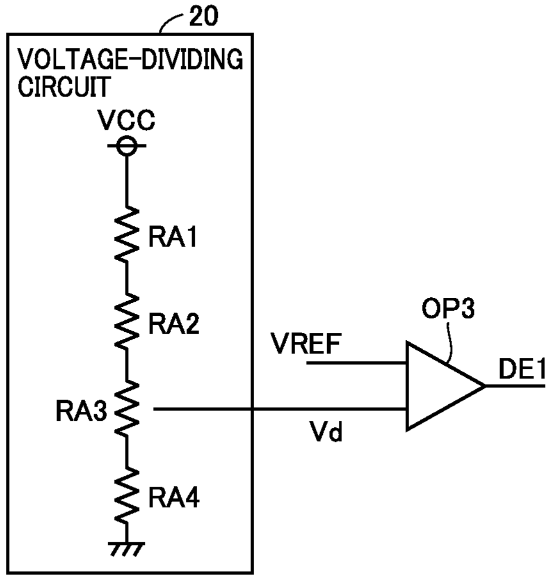
FIG. 11 is a diagram showing the configuration of a voltage-dividing circuit within an external voltage monitoring circuit 5.

FIG. 11 is a diagram showing the configuration of voltage-dividing circuit 20 within external voltage monitoring circuit 5.

Voltage-dividing circuit 20 generates a voltage Vd obtained by resistance-dividing power supply voltage VCC, and outputs the generated voltage to operational amplifier OP3.

Operational amplifier OP3 compares voltage Vd and reference voltage VREF, and outputs a detection signal DE1 showing the comparison result.

Voltage-dividing circuit 20 is formed only of resistance elements RA1 to RA4, and therefore, less influenced by stress. Furthermore, voltage-dividing circuit 20 outputs a voltage Vd by a resistance ratio. Accordingly, all of resistance elements RA1 to RA4 are arranged in a corner region, so as to cause the influence of stress to be uniformly exerted upon all of resistance elements RA1 to RA4, so that the resistance ratio is kept unchanged. Consequently, voltage Vd can be prevented from being changed.

Therefore, in the present embodiment, voltage-dividing circuit 20 is arranged in the corner region of the semiconductor chip.

When the wiring line connecting voltage-dividing circuit 20 and operational amplifier OP3 is increased in length, noise is more likely to be mixed in the process of transmitting voltage Vd. Accordingly, in the embodiment of the present invention, voltage-dividing circuit 20 and operational amplifier OP3 are arranged so as to be close to each other.

(Pulse Filter (PF) 22)

Figure 12:
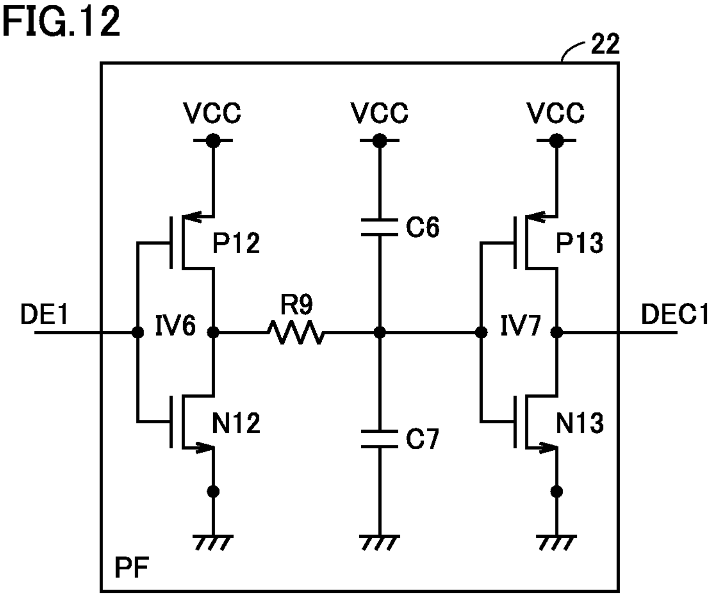
FIG. 12 is a diagram showing the configuration of a PF 22.

FIG. 12 is a diagram showing the configuration of a PF 22.

PF 22 includes: an inverter W6 formed of a P-channel MOS transistor P12 and an N-channel MOS transistor N12, and an inverter W7 formed of a P-channel MOS transistor P13 and an N-channel MOS transistor N13. PF 22 further includes: capacitive elements C6 and C7 connected in series between external power supply voltage VCC and the ground and a resistance element R9 provided between the output of inverter W6 and the input of inverter IV7.

Inverter W6 receives an output signal DE1 from operational amplifier OP3. The input of inverter IV7 is connected between capacitive element C6 and capacitive element C7. Inverter IV7 outputs a detection signal DEC1.

PF 22 is a digital circuit. In other words, signal DE1 to be input and signal DEC1 to be output each are a low-level or high-level digital signal.

Therefore, even if the elements forming PF 22 are influenced by stress, the characteristics of signal DEC1 to be output are not significantly changed.

Therefore, in the present embodiment, the entire circuit of PF 22 is arranged in a corner region.

Furthermore, signal DE1 to be input and signal DEC1 to be output each are a digital signal. Accordingly, even if noise is mixed in the wiring line leading to the circuit connected to PF 22, these signals are less influenced by noise. Therefore, in the present embodiment, PF 22 and a circuit (operational amplifier OP3) connected to this PF 22 are arranged so as to be relatively away from each other in consideration of the space in the entire circuit.

(Burn-in Test Circuit 24)

Figure 13:
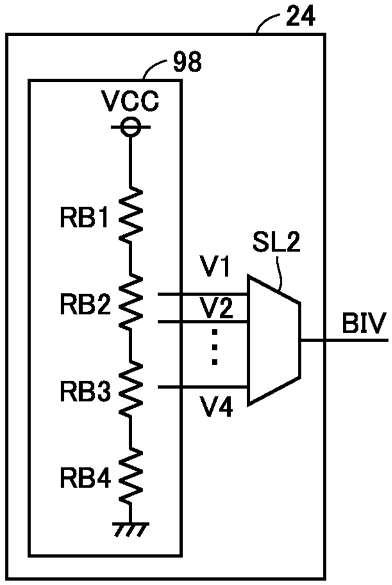
FIG. 13 is a diagram showing the configuration of a burn-in test circuit 24.

FIG. 13 is a diagram showing the configuration of burn-in test circuit 24.

Burn-in test circuit 24 includes a voltage-dividing circuit 98.

Voltage-dividing circuit 98 generates voltages V1 to V4 obtained by resistance-dividing power supply voltage VCC, and outputs the generated voltages to a selector SL2. Selector SL2 selects one of received voltages V1 to V4 and outputs the selected voltage as burn-in test voltage BIV.

Voltage-dividing circuit 98 is formed only of resistance elements RB1 to RB4, and therefore, less influenced by stress. Furthermore, voltage-dividing circuit 98 outputs voltages V1 to V4 by a resistance ratio. Accordingly, all of resistance elements RB1 to RB4 are arranged in a corner region of the semiconductor chip, so as to cause the influence of stress to be uniformly exerted upon all of resistance elements RB1 to RB4, so that the resistance ratio is kept unchanged. Consequently, voltages V1 to V4 can be prevented from being changed.

Furthermore, burn-in test circuit 24 is used only during a test, and accordingly, does not relate to an important actual operation of semiconductor device 81. Therefore, the influence of noise does not cause serious damage.

Therefore, in the present embodiment, the entire burn-in test circuit 24 is arranged in the corner region of the semiconductor chip.

Furthermore, when the wiring line connecting burn-in test circuit 24 and the circuit connected to this burn-in test circuit 24 is increased in length, noise is more likely to be mixed in the wiring line. As set forth above, however, burn-in test circuit 24 does not relate to an important actual operation of semiconductor device 81.

Therefore, in the present embodiment, burn-in test circuit 24 and the circuit connected to burn-in test circuit 24 (that is, selector 8) are arranged so as to be relatively away from each other in consideration of the space in the entire circuit.

(Monitor Circuit 23)

Figure 14:
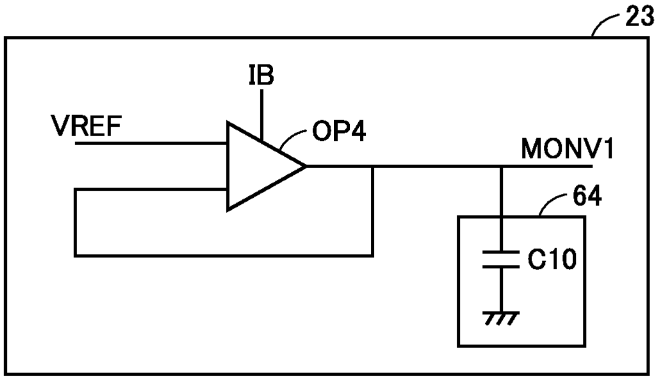
FIG. 14 is a diagram showing the configuration of a monitor circuit 23 included in a monitor circuit group.

FIG. 14 is a diagram showing the configuration of a monitor circuit 23 included in a monitor circuit group 623.

Monitor circuit 23 includes an operational amplifier OP4 having a buffering function.

Operational amplifier OP4, which serves as a voltage follower circuit of an amplification degree 1, receives reference voltage VREF and outputs a monitor voltage MONV1.

Monitor circuit 23 includes an output stabilization circuit 64 formed of a capacitive element C10 for the purpose of improving the phase margin and the PSRR of operational amplifier OP4. Output stabilization circuit 64 may be formed of a resistance element and a capacitive element in place of capacitive element C10.

Output stabilization circuit 64 is formed of capacitive element C10 (or a capacitive element and a resistance element as a modification), and therefore, less influenced by stress. Furthermore, a margin can be relatively readily provided for output stabilization circuit 64 even if this output stabilization circuit 64 is influenced by stress.

Therefore, in the present embodiment, output stabilization circuit 64 is arranged in a corner region of the semiconductor chip. Operational amplifier OP4 is more likely to be influenced by stress. Also, when operational amplifier OP4 is arranged so as to be away from reference voltage generation circuit 3, the wiring line for transmitting reference voltage VREF is increased in length. Accordingly, noise is more likely to be mixed into reference voltage VREF. Therefore, operational amplifier OP4 is not arranged in a corner region of the semiconductor chip.

When the wiring line connecting output stabilization circuit 64 and operational amplifier OP4 included within monitor circuit 23 and connected to this output stabilization circuit 64 is increased in length, noise is more likely to be mixed in the wiring line. Accordingly, in the embodiment of the present invention, output stabilization circuit 64 and operational amplifier OP4 are arranged so as to be close to each other.

(Monitor Circuit 23)

Figure 15:
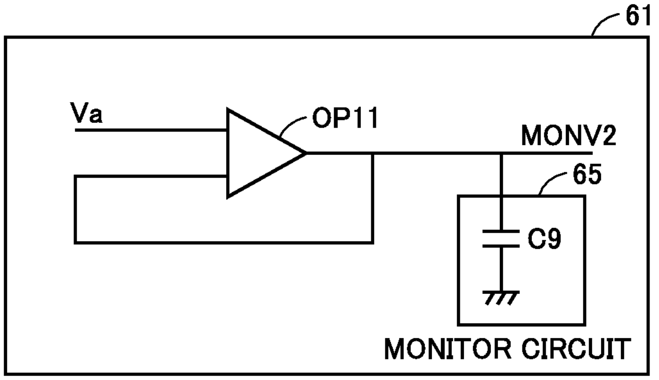
FIG. 15 is a diagram showing the configuration of a monitor circuit 61 included in the monitor circuit group.

FIG. 15 is a diagram showing the configuration of a monitor circuit 61 included in monitor circuit group 623.

Monitor circuit 61 includes an operational amplifier OP11 having a buffering function.

Operational amplifier OP11, which serves as a voltage follower circuit of an amplification degree 1, receives Va and outputs a monitor voltage MONV2.

Monitor circuit 61 includes an output stabilization circuit 65 formed of a capacitive element C9 for the purpose of improving the phase margin and the PSRR of operational amplifier OP11.

Output stabilization circuit 65 may be formed of a resistance element and a capacitive element in place of capacitive element C9.

Output stabilization circuit 65 is formed of capacitive element C9 (or a capacitive element and a resistance element as a modification), and therefore, less influenced by stress. Furthermore, a margin can be relatively readily provided for output stabilization circuit 65 even if this output stabilization circuit 65 is influenced by stress.

Therefore, in the present embodiment, output stabilization circuit 65 is arranged in a corner region of the semiconductor chip. On the other hand, when operational amplifier OP11 is arranged so as to be away from reference voltage generation circuit 3, the wiring line for transmitting voltage Va is increased in length. Accordingly, noise is more likely to be mixed into voltage Va. Therefore, operational amplifier OP11 is not arranged in a corner region of the semiconductor chip.

When the wiring line connecting output stabilization circuit 65 and operational amplifier OP11 included within monitor circuit 61 and connected to this output stabilization circuit 65 is increased in length, noise is more likely to be mixed in the wiring line. Accordingly, in the embodiment of the present invention, output stabilization circuit 65 and operational amplifier OP11 are arranged so as to be close to each other.

(Monitor Circuit 62)

Figure 16:
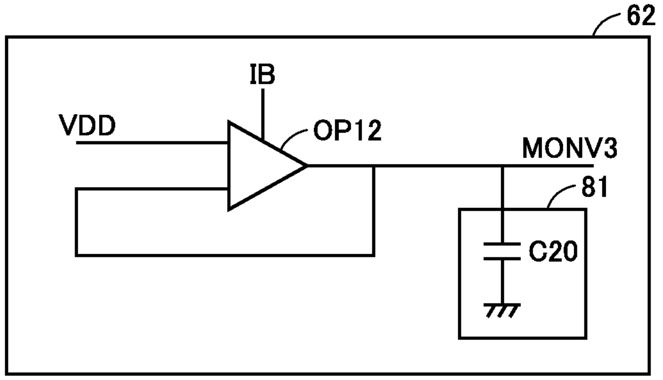
FIG. 16 is a diagram showing the configuration of a monitor circuit 62 included in the monitor circuit group.

FIG. 16 is a diagram showing the configuration of a monitor circuit 62 included in monitor circuit group 623.

Monitor circuit 62 includes an operational amplifier OP12 having a buffering function.

Operational amplifier OP12, which serves as a voltage follower circuit of an amplification degree 1, receives an internal voltage VDD and outputs a monitor voltage MONV3.

Monitor circuit 62 includes an output stabilization circuit 81 formed of a capacitive element C20 for the purpose of improving the phase margin and the PSRR of operational amplifier OP12. Output stabilization circuit 81 may be formed of a resistance element and a capacitive element in place of capacitive element C20.

Output stabilization circuit 81 is formed of capacitive element C20 (or a capacitive element and a resistance element as a modification), and therefore, less influenced by stress. Furthermore, a margin can be relatively readily provided for output stabilization circuit 81 even if this output stabilization circuit 81 is influenced by stress.

Furthermore, reference voltage VREF and voltage Va are supplied to other circuits within power supply IP circuit 1, and therefore, need to be monitored with high accuracy. Internal voltage VDD is however not supplied to other circuits within power supply IP circuit 1. Accordingly, merely a slight accuracy deterioration may not cause a problem.

Therefore, in the present embodiment, not only output stabilization circuit 81 but also the entire monitor circuit 62 including operational amplifier OP12 is arranged in a corner region of the semiconductor chip.

Furthermore, in consideration of the tolerance of noise in internal voltage VDD and the space in the circuit, monitor circuit 62 arranged in the corner region of the semiconductor chip and regulator 9 serving to output internal voltage VDD that is to be input into monitor circuit 62 are arranged so as to be relatively away from each other.

(Monitor Circuit 63)

Figure 17:
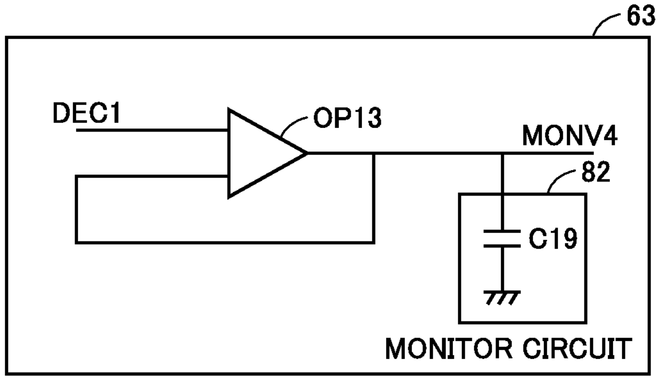
FIG. 17 is a diagram showing the configuration of a monitor circuit 63 included in the monitor circuit group.

FIG. 17 is a diagram showing the configuration of a monitor circuit 63 included in monitor circuit group 623.

Monitor circuit 63 includes an operational amplifier OP13 having a buffering function.

Operational amplifier OP13, which serves as a voltage follower circuit of an amplification degree 1, receives a detection signal DEC1 and outputs a monitor voltage MONV4.

Monitor circuit 63 includes an output stabilization circuit 82 formed of a capacitive element C19 for the purpose of improving the phase margin and the PSRR of operational amplifier OP13. Output stabilization circuit 82 may be formed of a resistance element and a capacitive element in place of capacitive element C19.

Output stabilization circuit 82 is formed of capacitive element C19 (or a capacitive element and a resistance element as a modification), and therefore, less influenced by stress. Furthermore, a margin can be relatively readily provided for output stabilization circuit 82 even if this output stabilization circuit 82 is influenced by stress.

Furthermore, since reference voltage VREF and voltage Va are supplied to other circuits within power supply IP circuit 1, and therefore, need to be monitored with high accuracy. Detection signal DEC1 is however not supplied to other circuits within power supply IP circuit 1. Accordingly, merely a slight accuracy deterioration may not cause a problem.

Therefore, in the present embodiment, not only output stabilization circuit 82 but also the entire monitor circuit 63 including operational amplifier OP13 is arranged in a corner region of the semiconductor chip.

(LPF 25)

Figure 18:
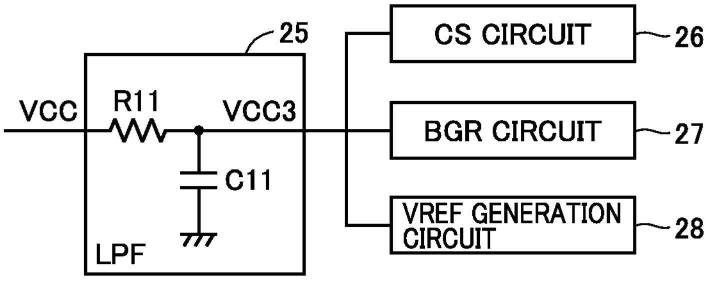
FIG. 18 is a diagram showing the configuration of a low pass filter (LPF).

FIG. 18 is a diagram showing the configuration of a low pass filter (LPF) 25.

LPF 25 is used in order to reduce noise in power supply voltage VCC.

LPF 25, which consists only of a resistance element R11 and a capacitive element C11, receives external power supply voltage VCC and outputs voltage VCC3 from which noise has been removed.

The resistance element and the capacitive element are less influenced by stress. Furthermore, LPF 25 serves to remove noise in external power supply voltage VCC. Accordingly, even if the characteristics of LPF 25 are changed under influence of stress, the circuit that receives output voltage VCC3 is less influenced thereby.

Therefore, in the present embodiment, the entire circuit of LPF 25 is arranged in a corner region of the semiconductor chip.

When the wiring line connecting LPF 25 and the circuit receiving output voltage VCC3 of this LPF 25 is increased in length, noise is more likely to be mixed in the process of transmitting output voltage VCC3. Accordingly, in the present embodiment, LPF 25 arranged in the corner region of the semiconductor chip and the circuit arranged in the core region on the inner side of the edge of the semiconductor chip and receiving output voltage VCC3 of LPF 25 are arranged so as to be close to each other.

In this case, output voltage VCC3 of LPF 25 is received by remaining circuits within internal voltage monitoring circuit 2 (CS circuit 26, BGR circuit 27, VREF generation circuit 28, and operational amplifier OP5).

(Output Stabilization Circuit within VREF Generation Circuit 28)

Figure 19:
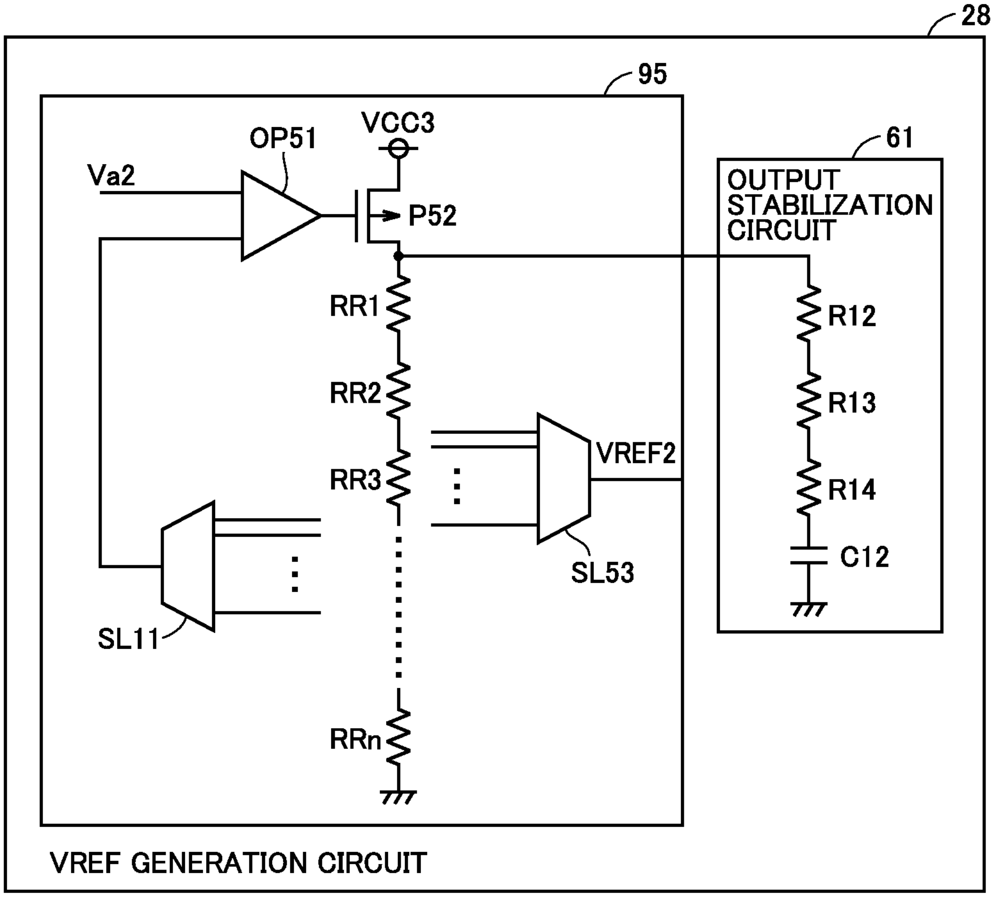
FIG. 19 is a diagram showing the configuration of the VREF generation circuit.

FIG. 19 is a diagram showing the configuration of VREF generation circuit 28.

VREF generation circuit 28 includes a voltage generation unit 95.

Voltage generation unit 95 includes: an operational amplifier OP51; selectors SL53 and SL11; a PMOS transistor P52 and a plurality of series-connected resistance elements RR1 to RRn that are arranged between external power supply voltage VCC3 and the ground.

Operational amplifier OP51 amplifies the difference between voltage Va2 output from BGR circuit 27 and the output of selector SL11, and outputs the resultant to the gate of P-channel MOS transistor P52.

Selector SL53 outputs, as reference voltage VREF2, the voltage on the node selected from the nodes between a plurality of resistance elements adjacent to each other.

Selector SL11 outputs the voltage on the node selected depending on the process variation from the nodes between a plurality of resistance elements adjacent to each other.

VREF generation circuit 28 is provided with a feedback path, and therefore, includes an output stabilization circuit 61 for improving the phase margin and the PSRR (Power Supply Rejection Ratio) of operational amplifier OP51.

Output stabilization circuit 61 includes resistance elements R12, R13 and R14 and a capacitive element C12 that are connected in series between the ground and the node located between PMOS transistor P52 and resistance element RR1. Output stabilization circuit 61 is formed only of a resistance element and a capacitive element, and therefore, less influenced by stress. Even if this output stabilization circuit 61 is influenced by stress, a margin can be relatively readily provided for VREF generation circuit 28.

Therefore, in the present embodiment, output stabilization circuit 61 is arranged in a corner region of the semiconductor chip.

When the wiring line connecting output stabilization circuit 61 and voltage generation unit 95 located within VREF generation circuit 28 and connected to this output stabilization circuit 61 is increased in length, noise is more likely to be mixed in the wiring line. Accordingly, in the embodiment of the present invention, output stabilization circuit 61 included within VREF generation circuit 28 and arranged in the corner region of the semiconductor chip and voltage generation unit 95 included within VREF generation circuit 28 and arranged in the core region on the inner side of the edge of the semiconductor chip are arranged so as to be close to each other.

(CS Circuit 26)

Figure 20:
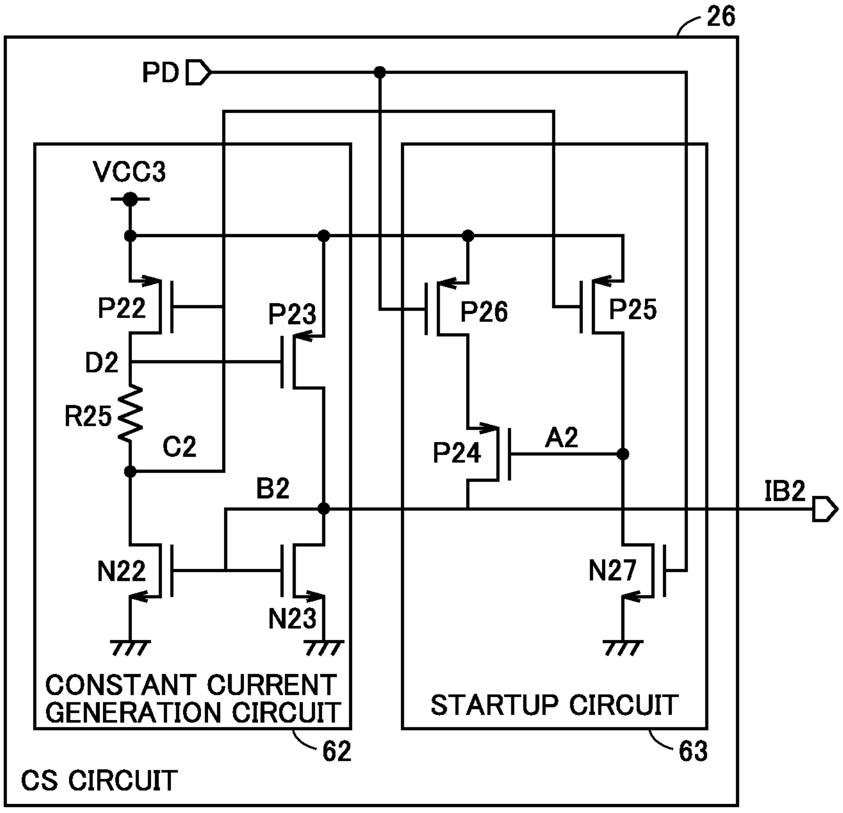
FIG. 20 is a diagram showing the configuration of a CS circuit.

FIG. 20 is a diagram showing the configuration of CS circuit 26.

CS circuit 26 includes a constant current generation circuit 62 and a startup circuit 63.

Constant current generation circuit 62 includes a P-channel MOS transistor P22, a resistance element R25, and an N-channel MOS transistor N22 that are connected in series between power supply voltage VCC3 and the ground. Furthermore, constant current generation circuit 62 includes a P-channel MOS transistor P23 and an N-channel MOS transistor N23 that are connected in series between power-supply voltage VCC3 and the ground.

Startup circuit 63 includes: a P-channel MOS transistor P24 provided between external power supply voltage VCC3 and node B2; and a P-channel MOS transistor P25 and an N-channel MOS transistor N27 connected in series between external power supply voltage VCC3 and the ground.

A node C2 between N-channel MOS transistor N22 and resistance element R25 is connected to the gate of P-channel MOS transistor P22 and the gate of P-channel MOS transistor P25.

The gate of P-channel MOS transistor P23 is connected to a node D2 between P-channel MOS transistor P22 and resistance element R25. The gate of N-channel MOS transistor N22 and the gate of N-channel MOS transistor N23 are connected to node B2. The gate of P-channel MOS transistor P24 is connected to a node A2 between P-channel MOS transistor P25 and P-channel MOS transistor N27.

The gate of P-channel MOS transistor P25 and the gate of N-channel MOS transistor P27 receive a power-down cancellation signal PD from PMU circuit 7.

Since two stabilization points exist in constant current generation circuit 62, these two stabilization points are converged by startup circuit 63 into one stabilization point, at which a normal operation can be performed.

Since the level of power-down cancellation signal PD is unfixed until external power supply voltage VCC rises, constant current generation circuit 62 may not be able to output a normal constant current IB until external power supply voltage VCC rises. This is however not problematic because it is less necessary to ensure that the circuit disposed within internal voltage monitoring circuit 2 and using constant IB is operated at the time when external power supply voltage VCC rises.

When power-down cancellation signal PD attains a high level after external power supply voltage VCC rises, N-channel MOS transistor N27 is turned on, node A2 within startup circuit 63 attains a low level, and P-channel MOS transistor P24 is turned on. Then, when the power-down cancellation signal attains a low level, P-channel MOS transistor P26 is turned on, so that a current is supplied into constant current generation circuit 62 through node B2. When constant current generation circuit 62 attains a level close to a stabilization point, node A2 attains a high level and P-channel MOS transistor P24 is turned off, so that stabilized constant current IB2 is output from node B2.

Since CS circuit 26 does not include resistance element R6 of a large size that is included in CS circuit 11 in FIG. 5, this CS circuit 26 has a relatively small circuit area. In the case of CS circuit 26, some parts thereof do not have to be arranged in a corner region of the semiconductor chip unlike CS circuit 11. Accordingly, the entire CS circuit 26 is arranged in the core region on the inner side of the edge of the semiconductor chip.

(Arrangement Example)

Then, an explanation will be given with regard to the arrangement of each component within power supply IP circuit 1 and internal voltage monitoring circuit 2 utilizing the characteristics of each component within power supply IP circuit 1 and internal voltage monitoring circuit 2 as described above.

Figure 21:
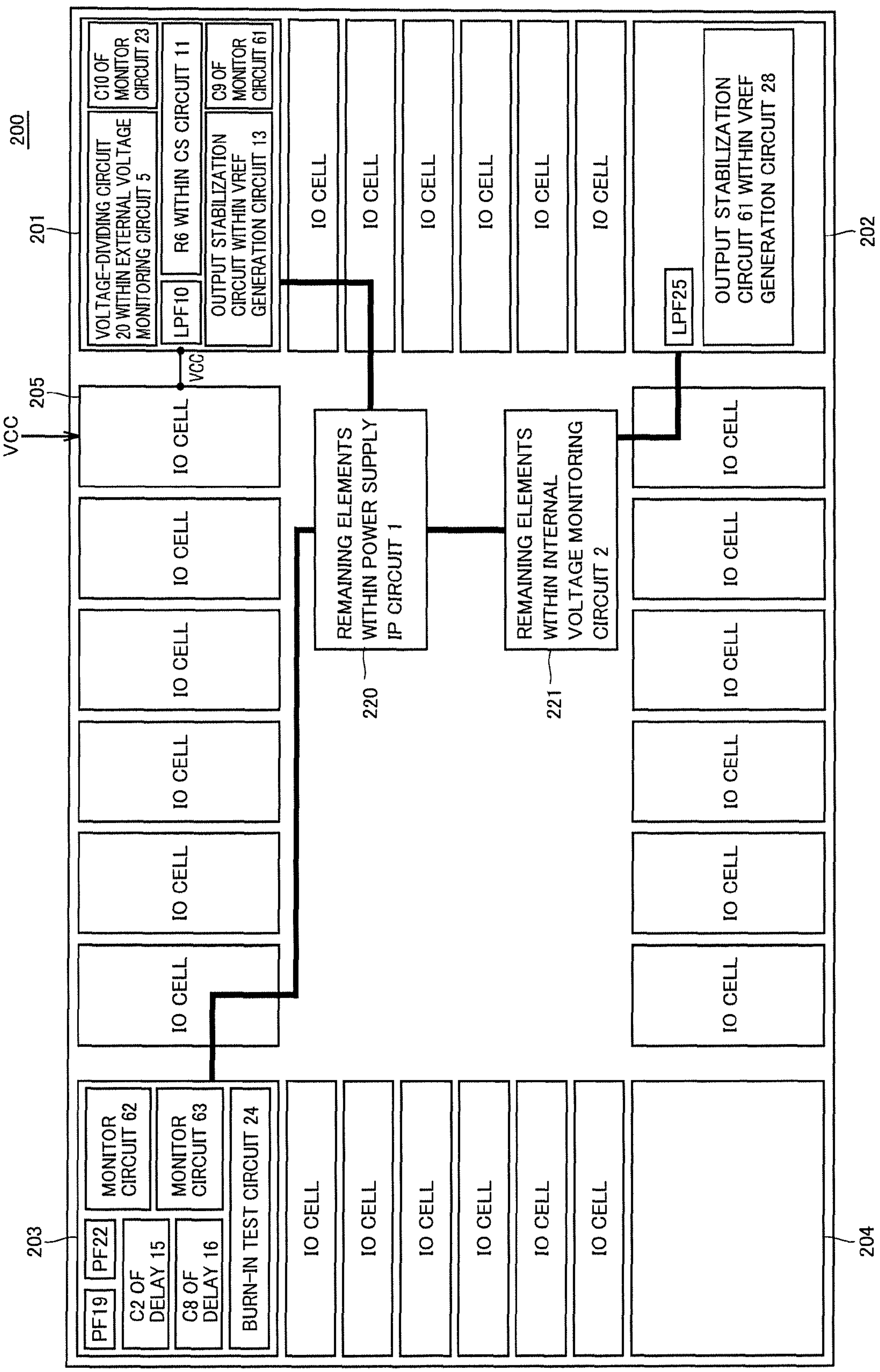
FIG. 21 is a diagram showing an arrangement example of each component within the power supply IP circuit and the internal voltage monitoring circuit on the semiconductor chip in the second embodiment.

FIG. 21 is a diagram showing an arrangement example of each component within power supply IP circuit 1 and internal voltage monitoring circuit 2 on semiconductor chip 200 in the second embodiment.

This semiconductor chip 200 has a rectangular shape. A plurality of IO cells 205 are arranged on each of four edges of the semiconductor chip.

IO cell 205 includes a set of a PAD, an input buffer, an output buffer, an ESD protection circuit, and the like. The plurality of IO cells 205 are all in the same size.

The semiconductor chip includes four corner regions 201, 202, 203, and 204.

Among the elements included in power supply IP circuit 1, elements that can be arranged in the corner region of the chip are arranged in corner region 201 and corner region 203. Elements that need to be arranged close to an element to be connected are arranged in corner region 201. Element that can be arranged away from an element to be connected are arranged in corner region 203.

Among the elements within power supply IP circuit 1, remaining elements that are not arranged in corner region 201 and corner region 203 are arranged in first region 220 within the core region on the inner side of the edge of the semiconductor chip. Among four corner regions 201 to 204, corner region 201 is located at a position closest to first region 220.

Among the elements included in internal voltage monitoring circuit 2, elements that can be arranged in the corner region of the chip are arranged in corner region 202.

Among the elements included in internal voltage monitoring circuit 2, remaining elements that are not arranged in corner region 202 are arranged in second region 221 within the core region on the inner side of the edge of the semiconductor chip. Among four corner regions 201 to 204, corner region 202 is located at a position closest to second region 221.

In this way, the remaining elements within power supply IP circuit 1 and the remaining elements within internal voltage monitoring circuit 2 are arranged in separate regions 220 and 221, respectively, within the core region. Thereby, elements that can be arranged in the corner region within power supply IP circuit 1 and that need to be arranged close to the remaining elements; and elements that can be arranged in the corner region within internal voltage monitoring circuit 2 can be arranged in separate corner regions 201 and 202, respectively.

If the remaining elements within power supply IP circuit 1 and the remaining elements within internal voltage monitoring circuit 2 are arranged in one region within the core region, the elements that can be arranged in the corner region within power supply IP circuit 1 and that need to be arranged close to the remaining elements; and the elements that can be arranged in the corner region within internal voltage monitoring circuit 2 have to be arranged in one corner region. In this case, however, all of these elements cannot be arranged in one corner region.

Furthermore, in the present embodiment, internal voltage monitoring circuit 2 is arranged away from CS circuit 11 and LPF 10 within reference voltage generation circuit 3 within power supply IP circuit 1. If internal voltage monitoring circuit 2 operates upon receiving constant current IB output from CS circuit 11 and power supply voltage VCC2 output from LPF 10, internal voltage monitoring circuit 2 is influenced by the noise mixed into constant current IB and power supply voltage VCC2. Accordingly, in the present embodiment, dedicated CS circuit 26 and LPF 25 are to be provided within internal voltage monitoring circuit 2.

In this case, the entire LPF 10 (formed of a resistance element and a capacitive element) shown in FIG. 4; output stabilization circuit 51 (formed of a resistance element and a capacitive element) within VREF generation circuit 13 shown in FIG. 6; and resistance element R6 within CS circuit 11 shown in FIG. 5 are arranged in first corner region 201. Furthermore, voltage-dividing circuit 20 (formed of a resistance element) within external voltage monitoring circuit 5 shown in FIG. 11; output stabilization circuit 64 (formed of a capacitive element) within monitor circuit 23 shown in FIG. 14; and output stabilization circuit 65 (formed of a capacitive element) within monitor circuit 61 shown in FIG. 15 are also arranged in first corner region 201.

In third corner region 203, capacitive element C2 within DELAY 15 shown in FIG. 8; capacitive element C8 within DELAY 16 shown in FIG. 9; the entire PF 19 shown in FIG. 10; the entire PF 22 shown in FIG. 12; and the entire burn-in test circuit 24 shown in FIG. 13 are arranged. Furthermore, in third corner region 203, the entire monitor circuit 62 shown in FIG. 16; and the entire monitor circuit 63 shown in FIG. 17 are also arranged.

Capacitive elements C2 and C8 can be arranged at a position away from the circuit connected to these elements. This is because the increased delay amount and the mixture of noise do not cause a problem, as set forth above. PF 19 and PF 22 can be arranged at a position away from the circuit connected to these PF 19 and PF 22. This is because the input/output signal is a digital signal, as set forth above. Burn-in test circuit 24 can be arranged at a position away from the circuit connected thereto. This is because the burn-in test is not related to an important actual operation of semiconductor device 81, as set forth above. Monitor circuits 62 and 63 can be arranged at a position away from the circuit connected to these circuits. This is because internal voltage VDD and detection signal DEC1 are less likely to cause a problem even if these voltage and signal do not have to be monitored with high accuracy, as set forth above.

In second corner region 202, the entire LPF 25 (formed of a resistance element and a capacitive element) shown in FIG. 18 and output stabilization circuit 61 (formed of a resistance element and a capacitive element) within VREF generation circuit 28 shown in FIG. 19 are arranged.

As described above, according to the present embodiment, some elements forming a power supply IP circuit are arranged in two corner regions that each are a dead space in which an JO cell cannot be arranged, and some elements forming an internal voltage monitoring circuit are arranged in one corner region. Thereby, it becomes possible to increase the number of elements that can be arranged in the semiconductor chip. Furthermore, among some elements forming the power supply IP circuit, elements that are susceptible to noise when the wiring line is increased in length are arranged in a corner region close to the region in which the remaining elements forming the power supply IP circuit are arranged. Thereby, mixture of noise can be prevented.

Third Embodiment

Figure 22:
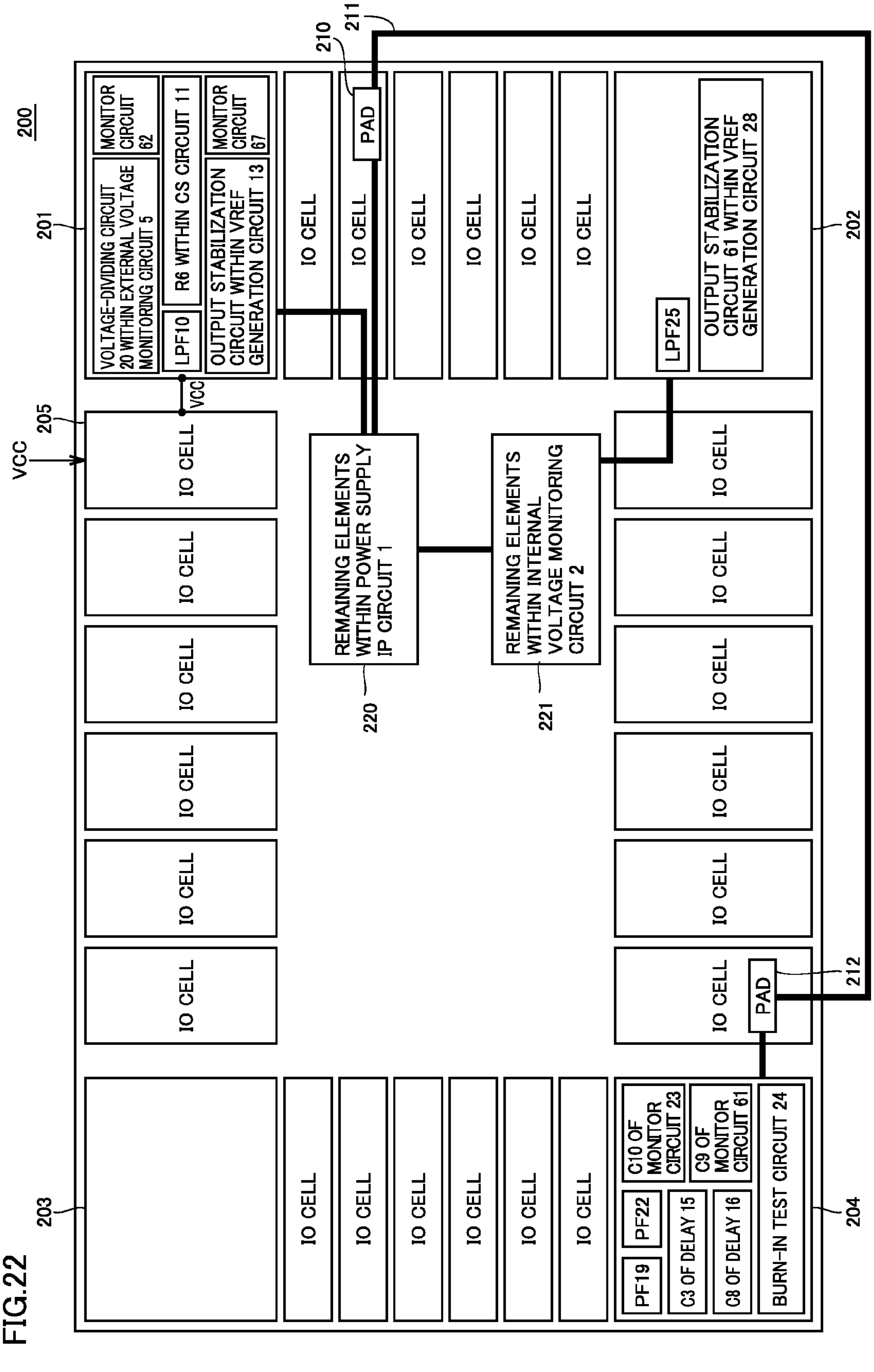
FIG. 22 is a diagram showing an arrangement example of each component within a power supply IP circuit and an internal voltage monitoring circuit on a semiconductor chip in the third embodiment.

FIG. 22 is a diagram showing an arrangement example of each component within power supply IP circuit 1 and internal voltage monitoring circuit 2 on a semiconductor chip 200 in the third embodiment.

This arrangement example is different from the arrangement example in FIG. 21 in that, among the elements within power supply IP circuit 1, elements that can be arranged in a remote corner region are arranged in corner region 204 in place of corner region 203.

Furthermore, in the second embodiment, first region 220 within the core region and corner region 203 are connected only via a wiring line within the semiconductor chip. In contrast, in the third embodiment, first region 220 within the core region and corner region 204 are connected through a wiring line within the chip, a PAD 210 within the IO cell, a wiring line 211, and a PAD 212 within the IO cell.

Consequently, even in the case where elements are densely arranged in the core region so that it becomes difficult to provide a wiring line connecting first region 220 and corner region 204 within a chip, first region 220 and corner region 204 can be connected through a PAD and a wiring line.

In addition, different chips can also be connected in the case of the same package. Accordingly, remaining elements of power supply IP circuit I may be arranged in a first region S of a core region of a semiconductor chip A; among the elements within power supply IP circuit 1, elements that can be arranged in a remote corner region may be arranged in a corner region R of a semiconductor chip B; and a first region S and a corner region R may be connected through a PAD and a wiring line.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A semiconductor device comprising:

a semiconductor chip;

a plurality of IO cells arranged along an edge portion of said semiconductor chip; and a reference voltage generation circuit, mounted on said semiconductor chip, for receiving a power supply voltage supplied to an external power supply terminal and generating a reference voltage, wherein some elements forming said reference voltage generation circuit being arranged in a first corner region of said semiconductor chip, remaining elements forming said reference voltage generation circuit being arranged in a core region on an inner side of the edge portion of said semiconductor chip, and among a plurality of corner regions, said first corner region being located closest to said remaining elements.

2. The semiconductor device according to claim 1, wherein said some elements forming said reference voltage generation circuit include a low pass filter connected to said external power supply terminal.

3. The semiconductor device according to claim 1, wherein said some elements forming said reference voltage generation circuit include a resistance element included in a startup circuit of a constant current generation circuit.

4. The semiconductor device according to claim 1, wherein said some elements forming said reference voltage generation circuit include an element for output stabilization.

5. A semiconductor device comprising:

a semiconductor chip;

a plurality of IO cells arranged along an edge portion of said semiconductor chip; and a first circuit and a second circuit mounted on said semiconductor chip and connected to each other, wherein some elements forming said first circuit being arranged in a first corner region of said semiconductor chip, some elements forming said second circuit being arranged in a second corner region of said semiconductor chip, and remaining elements forming said first circuit and remaining elements forming said second circuit being arranged in a core region on an inner side of the edge portion of said semiconductor chip.

6. The semiconductor device according to claim 5, wherein the remaining elements forming said first circuit and the remaining elements forming said second circuit are arranged in a first region within said core region, among a plurality of corner regions, said first corner region is located closest to said first region, and said second corner region is a corner region other than said first corner region in the plurality of corner regions.

7. The semiconductor device according to claim 6, wherein elements arranged in said second corner region and some of elements arranged in said first region are connected through a pad within one of said IO cells and a wiring line.

8. The semiconductor device according to claim 6, wherein said first circuit is a reference voltage generation circuit that receives a power supply voltage supplied to an external power supply terminal and generates a reference voltage, and said second circuit is a power-on reset circuit.

9. The semiconductor device according to claim 8, wherein said some elements of said second circuit include a capacitive element included in a delay circuit.

10. The semiconductor device according to claim 8, wherein said some elements of said second circuit include a pulse filter.

11. The semiconductor device according to claim 8, further comprising a burn-in test circuit mounted on said semiconductor chip, wherein said burn-in test circuit is arranged in said second corner region.

12. The semiconductor device according to claim 8, further comprising a monitor circuit mounted on said semiconductor chip and monitoring said reference voltage, wherein an element for output stabilization within said monitor circuit is arranged in said first corner region.

13. The semiconductor device according to claim 8, further comprising a monitor circuit mounted on said semiconductor chip and monitoring an internal power supply voltage, wherein said monitor circuit is arranged in said second corner region.

14. The semiconductor device according to claim 8, further comprising an external voltage monitoring circuit mounted on said semiconductor chip, wherein a voltage-dividing circuit included in said external voltage monitoring circuit is arranged in said first corner region.

15. The semiconductor device according to claim 8, further comprising an external voltage monitoring circuit mounted on said semiconductor chip, wherein a pulse filter included in said external voltage monitoring circuit is arranged in said second corner region.

16. The semiconductor device according to claim 8, further comprising an internal voltage monitoring circuit, mounted on said semiconductor chip, for receiving the power supply voltage supplied to the external power supply terminal and monitoring an internal voltage, wherein some elements forming said internal voltage monitoring circuit are arranged in a third corner region of said semiconductor chip, remaining elements forming said internal voltage monitoring circuit are arranged in a second region within said core region, and among a plurality of corner regions, said third corner region is located closest to said second region.

17. The semiconductor device according to claim 16, wherein each element of the some elements forming said internal voltage monitoring circuit each is a low pass filter connected to said external power supply terminal.

18. The semiconductor device according to claim 16, wherein each element of the some elements forming said internal voltage monitoring circuit each is an element for output stabilization.

* * * * *